(12) United States Patent
Levin et al.

(10) Patent No.: US 10,962,443 B1
(45) Date of Patent: Mar. 30, 2021

(54) MULTI-FIBER CONNECTOR VISUAL POLARITY AND CONTINUITY TESTER

(71) Applicants: Piotr Anatolij Levin, Vilnius (LT); Sergej Karpichin, Vilnius (LT)

(72) Inventors: Piotr Anatolij Levin, Vilnius (LT); Sergej Karpichin, Vilnius (LT)

(73) Assignee: Lifodas, UAB, Vilnius (LT)

( * ) Notice: Subject to any disclaimer, the term of this patent is extended or adjusted under 35 U.S.C. 154(b) by 0 days.

(21) Appl. No.: 16/820,800

(22) Filed: Mar. 17, 2020

(51) Int. Cl.
*G01M 11/00* (2006.01)
(52) U.S. Cl.
CPC .................. *G01M 11/335* (2013.01)
(58) Field of Classification Search
CPC .... G01M 11/33; G01M 11/088; G01M 11/30; G01M 11/31; G01M 11/37; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/331; G01M 11/332; G01M 11/333; G01M 11/334–338; G02B 6/385; H04B 10/0731
USPC ......................................................... 356/73.1
See application file for complete search history.

(56) References Cited

U.S. PATENT DOCUMENTS

| | | | |
|---|---|---|---|
| 10,591,385 B2 * | 3/2020 | Perron | G01M 11/33 |
| 2018/0266918 A1 * | 9/2018 | Schell | G02B 6/42 |

* cited by examiner

*Primary Examiner* — Hoa Q Pham
(74) *Attorney, Agent, or Firm* — Catherine Napjus; Michael Persson; Chisholm, Persson & Ball. PC

(57) ABSTRACT

The test device of the present invention is configured to test the continuity and polarity of a plurality of fibers housed by a cable that extends between the multi-fiber connectors on either end of the cable. In its most basic form, the test device of the present invention includes first and second light sources; an optical splitter positioned between the second light source and the connector at the first end of the cable housing the plurality of fibers under test; and a receiver and configured for optical communication with the second end of the cable. The first light source creates a first light pattern, which is distinct from a second light pattern created by the second light source.

27 Claims, 3 Drawing Sheets

Fig. 3A
Fig. 3B
Fig. 3C
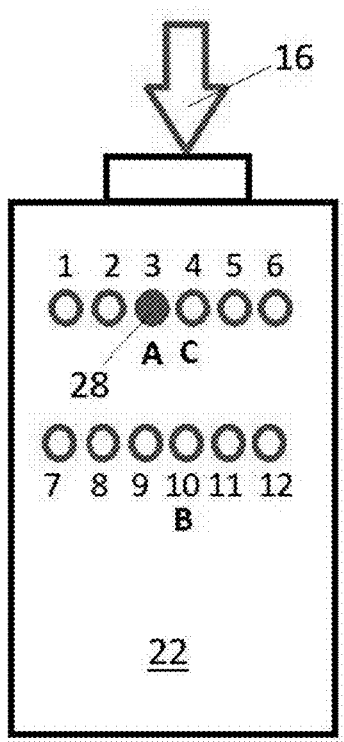
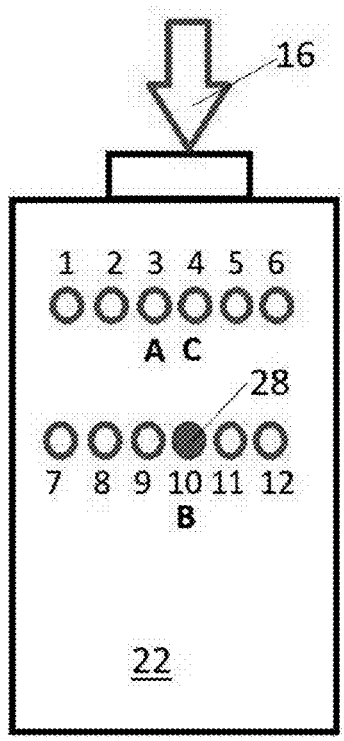
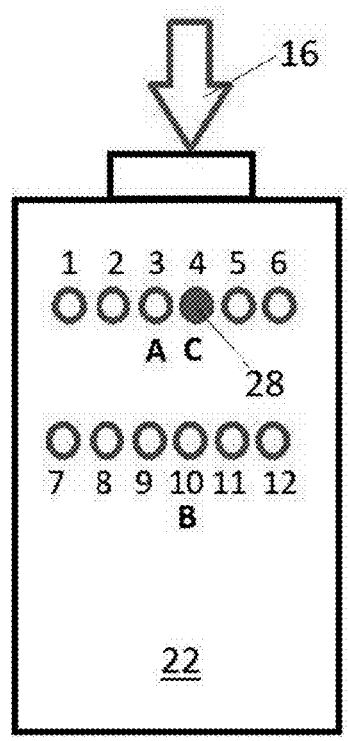

MULTI-FIBER CONNECTOR VISUAL POLARITY AND CONTINUITY TESTER

FIELD OF THE INVENTION

The present invention relates to fiber optic cable testers, and in particular, to a more efficient polarity and continuity tester.

BACKGROUND

Multi-fiber connectors are increasingly ubiquitous in optical fiber dense networks. Basic maintenance of the fiber optic cables within these networks requires testing the multi-fiber connectors for continuity (i.e. whether the fibers are broken) and correct polarity.

There are several common configurations of multi-fiber polarity. Type A polarity, illustrated in FIG. 1A, has a first fiber extend between position 1 at the first connector 14 on one end of the multi-fiber cable 34 to position 1 at the second connector 36 on the other end of the multi-fiber cable 34. The second fiber extends between position 2 at the first connector 14 and position 2 at the second connector 36, and so on. Type B polarity, illustrated in FIG. 1B, has a first fiber extend between position 1 at the first connector 14 and position 12 at the second connector 36. The second fiber extends between position 2 and position 11, and so on. Type C polarity, illustrated in FIG. 1C, has a first fiber extend between position 1 at the first connector 14 and position 2 at the second connector 36. The second fiber extends between position 2 at the first connector 14 and position 1 at the second connector 36. The third fiber extends between position 3 at the first connector 14 and position 4 at the second connector 36. The fourth fiber extends between position 4 at the first connector 14 and position 3 at the second connector 36, and so on. It is understood that such polarities may be used with multi-fiber cables 34 of fewer or greater than twelve fibers, with the same general patterns of the fibers extending between the two connectors 14, 36. It is also understood that the fiber polarities may not fall under any of these common configurations, and may be custom or proprietary.

The requirement to test the multi-fiber connectors for continuity and correct polarity is currently addressed through individual lasers for each fiber or expensive optical switches that couple light into each fiber. Examples of such prior art include the OP280MT Ribbon Visual Fault Locater sold under the trademark OPTOTEST. This product verifies correct polarity of ribbon fiber connectors by illuminating each of the twelve fibers with bright 635 nm red lasers. Another similar such prior art product is the MT Tracer sold under the trademark AFL. This product is a visual fault locator that provides twelve separately controlled visible lasers that can illuminate a selected fiber or automatically sequence through all twelve fibers. Both of these products use a laser for each fiber. Other prior art test products use one laser and an expensive optical switch to direct the one laser light into each of the twelve fibers. Many of these prior art test products also use expensive intelligent receivers with photodiodes and a display to receive and display the results of the test. Therefore, there is a need for a simpler, less expensive polarity and continuity tester for multi-fiber connectors.

SUMMARY OF THE INVENTION

The test device of the present invention is configured to test the continuity and polarity of a plurality of fibers housed by a cable that extends between the multi-fiber connectors on either end of the cable. In its most basic form, the test device of the present invention includes first and second light sources; an optical splitter positioned between the second light source and the connector at the first end of the cable housing the plurality of fibers under test; and a receiver configured for optical communication with the second end of the cable. The first light source creates a first light pattern, which is distinct from a second light pattern created by the second light source. The first light source is configured to couple light into a single fiber from the connector at the first end of the cable. The optical splitter is configured such that it splits light from the second light source so that each of the remaining fibers in the cable (other than the single fiber lit by the first light source) are lit by the second light source at the connector at the first end of the cable. The receiver is configured to receive and display the first and second light patterns at the connector at the second end after the respective light patterns have travelled through the plurality of fibers. Some embodiments of the test device of the present invention also include a controller. The controller may control any or all of the first and second light sources and the receiver. The controller is preferably a low power microcontroller, such as any of the microcontrollers sold under the trademarks of the STM32 series of ST. The light sources are preferably lasers, and preferably red lasers. Red lasers are preferred because they are easily visible, powerful, and inexpensive. The control of the first and second light sources is through electronic communication with the controller. One of at least ordinary skill in the art will recognize that the specific controller and light sources listed above are merely exemplary and that many controllers and light sources may be substituted for the purposes of the present invention. Each of these variations is considered to be within the scope of the present invention. For the avoidance of doubt, however, the simplest embodiments of the test device of the present invention do not require a controller.

The receiver is in optical communication with the second connector of the optical cable under test such that the receiver may detect and display the various light patterns are being emitted from the second connector. The receiver may be "passive" or "intelligent." As used herein, a "passive receiver" is a receiver that shows the actual light coming through the second connector and shows the light next to a number corresponding to the fiber out of which the light is being emitted. The passive receiver therefore is directly optically coupled to the visible signal from the second connector via a light pipe that illuminates the corresponding fiber number position on the display panel. Passive receivers generally do not require control from a controller, and as such, some test devices of the present invention that include a passive receiver do not include a controller. As used herein, an "intelligent receiver" is a receiver with a more advanced display, such as indicating from which fiber light is being emitted by photodiodes or other sensor types (e.g. a CMOS camera), rather than depending on the actual light being transmitted through the fiber. When intelligent receivers are used, one or both of the first and second light patterns may be in non-visible light, outside of the visible light spectrum. An intelligent receiver may also display other information. Intelligent receivers are much more expensive than passive receivers and usually require a controller. The intelligent receiver is therefore also optically coupled to the light source's emitted signals, but that signal is then electronically displayed.

The first and second light sources are configured to create distinct first and second light patterns, respectively. In many embodiments, the first and second light patterns are visually distinct from one another. In the preferred embodiment, for example, the first light pattern is simply blinking while the second light pattern is steady. In this way, at the receiver, it will be very easy to distinguish the single blinking fiber amongst all of the other steadily lit fibers. This is only an example though. The different patterns could also be different colored lasers or lights. The different patterns could be one rapidly blinking pattern and one slowly blinking pattern. The only criterion is that the first and second patterns be distinctive so that the single fiber through which the first light source with the first light pattern is directed is easily distinguishable from all of the others. As discussed above, in some embodiments non-visible light may be used for the first and/or second light patterns, usually with an intelligent receiver that might include a photodiode array. In addition, the distinction between the first and second light patterns may simply be that the first and second light sources have different wavelengths, polarization, or other modulation. In such an embodiment, the receiver would need to be able to detect the difference in wavelength.

To give a practical example of the present invention, let us assume we are testing the fibers in a twelve fiber cable for continuity and polarity. The cable is connectorized on each end, such as with MPO connectors or other connectors commonly used in the art. The first light source has a blinking first light pattern and it is directed onto position 3 of the first connector. The second light source has a steady second light pattern, which is split by the optical splitter so that this steady light pattern is directed into positions 1, 2, and 4-12. The receiver at the second end indicates light coming from each position. In this way, continuity of each fiber is verified. The receiver indicates that position 3 of the second connector is blinking. This indicates that this cable has Type A polarity, meaning that the light went straight through from position 3 at the first connector to position 3 at the second connector. If the receiver had indicated that position 10 were blinking at the second connector, then the cable would have Type B polarity. If the receiver had indicated that position 4 were blinking at the second connector, then the cable would have Type C polarity. The present invention may also test for less standard or custom or proprietary polarity configurations.

Again, let us assume that the blinking at position 3 of the second connector has indicated that the cable has Type A polarity. Now assume that not all positions at the second connector emitted light, indicating a lack of continuity on the fiber corresponding to the dark position(s). Knowing that the cable has Type A polarity, if position 5 at the second connector does not light, then we know that there is a fault on that fiber. If position 3 did not light, and positions 1, 2, and 4-12 all indicated the steady light of the second light pattern, then we would know that the cable has Type A polarity and a fault on fiber 3. All of the information needed to learn the continuity and polarity of each fiber is provided with only two lasers and an optical splitter. As such, the present invention eliminates the need for a laser for each fiber in the multi-fiber cable or the need for an expensive optical switch.

Some embodiments of the present invention also include a third light source. This is usually used when testing multi-fiber cables with many fibers, i.e. greater than 12, such as 24, 32 or greater. It is understood that a third light source may sometimes be used with 12 or fewer fibers as well, but this is not preferred as it is not typically necessary. In embodiments that include such a third light source, the third light source acts as a second second light source. The third light source is controlled by the controller. A second optical splitter is positioned between the third light source and the first connector. Typically, the third light source will produce the same second light pattern as the second light source. In this way, as above, at the second connector, the receiver will still indicate one blinking position from the first light source and then, for example, steady light from the other 31 positions, although that steady light was provided from both of the second and third light sources.

In some embodiments, the third light source is not acting to double the second light source as described above, but to act similarly to the first light source. In such embodiments the third light source has a third light pattern, which may be the same as the first light pattern. The third light source essentially acts as a second first light source. The third light source is directed onto a second single fiber within the cable, as the first light source is directed onto the first single fiber. As an example, let us assume the first light source has a rapidly blinking light pattern directed onto position 3 at the first connector and the third light source has a slowly blinking third light pattern directed onto position 8 at the first connector. If the receiver at the second connector indicates a rapidly blinking pattern at position 4 and a slowly blinking pattern at position 7, then we have double confirmation that the cable has Type C polarity. Such configurations merely provide additional evidence of the polarity of the cable. This should not be necessary, however, so these embodiments are not preferred as they add an additional component without necessarily providing additional functionality. If verification of the polarity is required, it would be preferred to use an embodiment with a single first light source and simply direct that first light source onto a different position of the first connector.

Some embodiments of the test device of the present invention include two or more additional light sources beyond that first and second light sources included in every variation of the present invention. Such additional light sources may be one additional light source backing up the second light source for cables with a large number of fibers and one additional light source to provide additional verification of polarity. Alternatively, there may be two additional light sources acting as additional second light sources. In every variation, however, the test device of the present invention will include fewer light sources than there are fibers under test. This is distinct from much of the prior art that includes a laser for every fiber.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 3A-3C exemplify displays on the receiver of the test device of the present invention, indicating Type A, Type B, and Type C polarities, respectively.

DETAILED DESCRIPTION

Figure 1A:
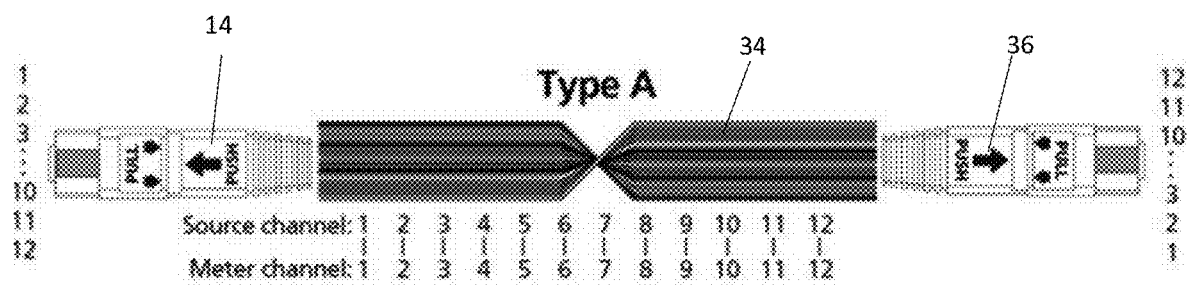
FIGS. 1A-1C are prior art diagrams of Types A, B, and C polarities, respectively.
Figure 1B:
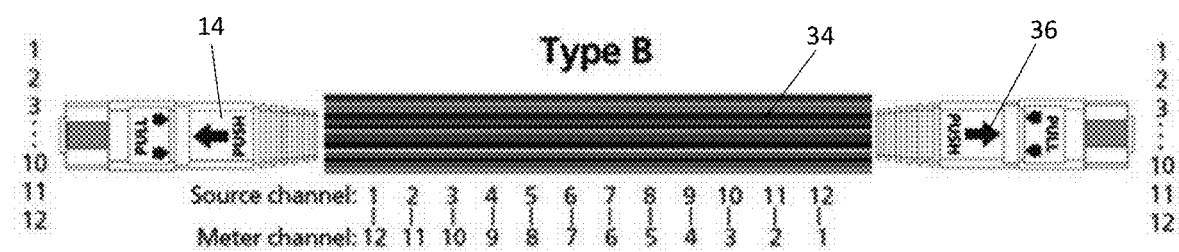
Figure 1C:
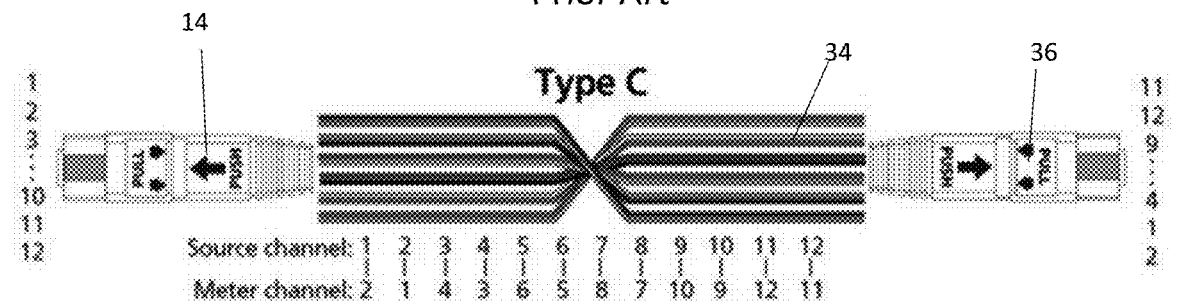
Figure 2A:
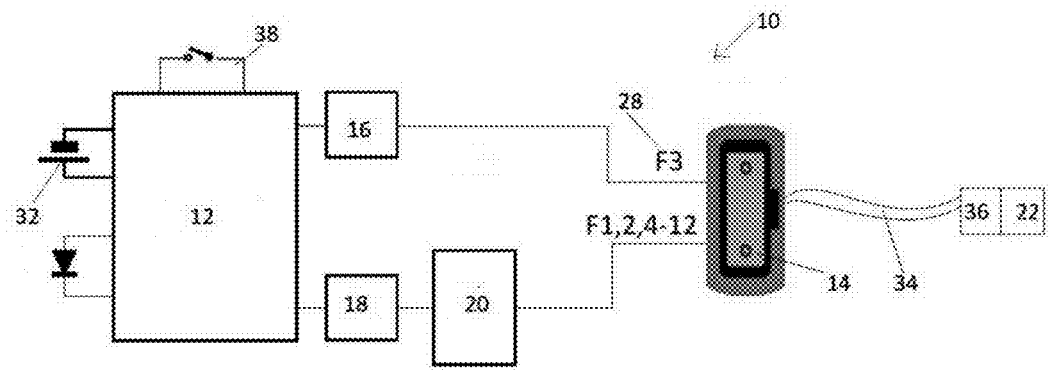
FIG. 2A is a diagram of the test device of the present invention configured for testing the fibers of a 12 fiber cable.

Referring first to FIG. 2A, a diagram of the test device 10 of the present invention configured for testing the fibers of a twelve fiber cable 34 is provided. Cable 34 houses twelve fibers, each of which terminate at both first connector 14 and second connector 36. Controller 12 is powered by power source 32, which is preferably a battery, such as an AA-sized or rechargeable battery, but may be any power source commonly used in the art. Controller 12 has power switch 38. First light source 16 sends a first light pattern into a single fiber 28 at position 3 ("F3") at first connector 14. Second light source 18 is split by optical splitter 20 so that the second light pattern of second light source 18 is sent through every other fiber in cable 34 ("F1, 2, 4-12"). Optical splitter 20 is preferably a standard 1×N splitter, but may be any optical splitter commonly used in the art. The "N" in a 1×N splitter is the maximum number of portions into which that splitter may split the light. In this case, a 1×16 splitter may be used, of which only 11 of the 16 channels are used. As optical splitters are easily sourced in standard configurations, such as 1×2, 1×4, 1×8, 1×16, etc., it is preferable to use such standard configurations, rather than customize a 1×11 splitter, for example. Receiver 22, in optical communication with second connector 36, indicates at which positions the light has emerged. Assuming no faults, the first light pattern should be visible emerging at a single position at second connector 36, while each of the other positions should show the second light pattern.

Figure 2B:
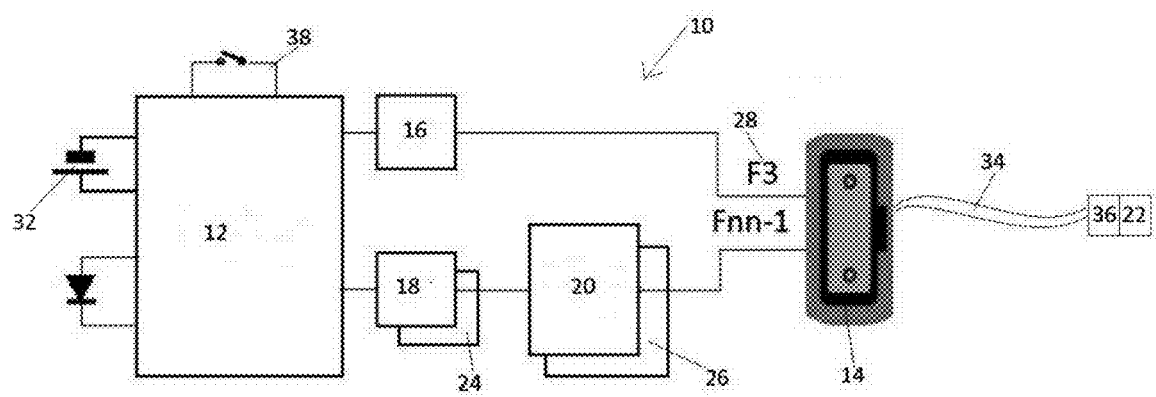
FIG. 2B is a diagram of the test device of the present invention configured for testing the fibers of a fiber cable with greater than 12 fibers.
Figure 2C:
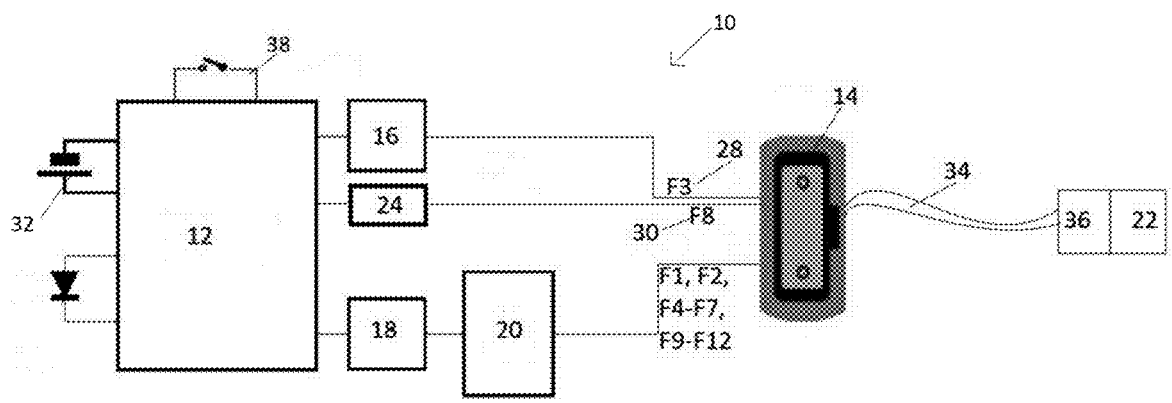
FIG. 2C is a diagram of the test device of the present invention configured for testing the fibers of a 12 fiber cable and providing additional polarity verification.

Now referring to FIG. 2B, a diagram of the test device 10 of the present invention configured for testing the fibers of a fiber cable 34 with greater than twelve fibers is provided. Cable 34 houses nn fibers, where nn is greater than 12, each of which terminates at both first connector 14 and second connector 36. The configuration is very similar to that shown in FIG. 2A, but includes third light source 24 and second optical splitter 26. The additional third light source 24 ensures that sufficient light is provided for each of the many fibers. A single first light source 18, as shown in FIG. 2A, may be used with more than twelve fibers, but the beam strength may be quite attenuated once split sufficiently many times to travel through all fibers (less fiber 28). Now referring to FIG. 2C, a diagram of the test device of the present invention configured for testing the fibers of a twelve fiber cable 34 and providing additional polarity verification is provided. In such embodiments the third light source 24 acts as a second first light source 16. Third light source 24 has a third light pattern, which may be the same as the first light pattern. The third light source 24 is directed onto a second single fiber 30 within the cable 34, just as the first light source 16 is directed onto the first single fiber 28. Let us assume that the first light source 28 has a rapidly blinking light pattern directed onto position 3 at the first connector 14 and the third light source 24 has a slowly blinking third light pattern directed onto position 8 at the first connector 14. If the receiver 22 at the second connector 36 indicates a rapidly blinking pattern at position 4 and a slowly blinking pattern at position 7, then we have double confirmation that the cable 34 has Type C polarity. Such configurations merely provide additional evidence of the polarity of the cable 34.

Now referring to FIGS. 3A-3C, displays on the receiver 22 of the test device 10 of the present invention, indicating Type A, Type B, and Type C polarities, respectively, are provided. The block between the arrow and receiver 22 is understood to represent all of the components under test between first light source 16 and receiver 22, including first connector 14, cable 34, and second connector 36. In each of FIGS. 3A-3C, first light source 16 is directed on position 3 at first connector 14. Receiver 22 is indicating out of which position that light is emerging at second connector 36. In FIG. 3A, the light is emerging at position 3 at the second connector 36, indicating Type A polarity. In FIG. 3B, the light is emerging at position 10 at the second connector 36, indicating Type B polarity. In FIG. 3C, the light is emerging at position 4 at the second connector 36, indicating Type C polarity. For clarity, FIGS. 3A-3C indicate a first light pattern of blinking light and a second light pattern of steady light. It is understood that in the preferred embodiment, assuming no faults on any fiber, the fiber positions shown as white in FIGS. 3A-3C would be emitting a steady second light pattern and the fiber positions shown as dark in FIGS. 3A-3C would be blinking first light patterns.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A test device configured to test a plurality of fibers housed by a cable extending between a first connector and a second connector, wherein the plurality of fibers are terminated at each of the first and second connectors, said test device comprising:
   a first light source;
   a second light source;
   a first optical splitter disposed between said second light source and the first connector; and
   a receiver in optical communication with the second connector;
   wherein:
      said first light source is configured to create a first light pattern;
      said second light source is configured to create a second light pattern;
      said first light pattern and said second light pattern are distinct;
      said first light source is configured to light a single first fiber housed by the cable at the first connector;
      said first optical splitter is configured to split light from said second light source such that each of the remaining plurality of fibers housed by the cable, other than at least the single first fiber lit by said first light source, are lit by said second light source via said first optical splitter at the first connector; and
      said receiver is configured to receive and display said first and second light patterns at the second connector after said first and second light patterns have travelled through the plurality of fibers.

2. The test device as claimed in claim 1, further comprising a controller, wherein said controller is in electronic communication with said first light source and said second light source.

3. The test device as claimed in claim 2, wherein said controller is also in electronic communication with said receiver.

4. The test device as claimed in claim 1, wherein said first light source and said second light source are red lasers.

5. The test device as claimed in claim 1, wherein said first light source and said second light source have different wavelengths.

6. The test device as claimed in claim 1, wherein said first light source and said second light source emit non-visible light.

7. The test device as claimed in claim 1, wherein said receiver is a passive receiver.

8. The test device as claimed in claim 1, wherein said receiver is an intelligent receiver.

9. The test device as claimed in claim 1, further comprising:
   a third light source; and
   a second optical splitter disposed between said third light source and the first connector;
   wherein:
      said third light source is configured to create said second light pattern; and
      said first and said second optical splitters are configured to split light from said second and third light sources such that each of the remaining plurality of fibers housed by the cable, other than the single first fiber lit by said first light source, are lit by said second and third light sources via said first and second optical splitters at the first connector.

10. The test device as claimed in claim 1, further comprising a third light source; wherein:
   said third light source is configured to create a third light pattern;
   said third light source is configured to light a single second fiber housed by the cable at the first connector; and
   said optical splitter is configured to split light from said second light source such that each of the remaining plurality of fibers housed by the cable, other than the single first fiber lit by said first light source and the single second fiber lit by said third light source, are lit by said second light source via said optical splitter at the first connector.

11. The test device as claimed in claim 1, comprising at least one additional light source, wherein:
   a total number of light sources, including said first light source, said second light source, and said at least one additional light source is less than a total number of fibers housed by the cable; and
   said at least one additional light source is configured to create one of a group consisting of said first light pattern and said second light pattern.

12. A test device configured to test a plurality of fibers housed by a cable extending between a first connector and a second connector, wherein the plurality of fibers are terminated at each of the first and second connectors, said test device consisting of:
   a first light source;
   a second light source;
   an optical splitter disposed between said second light source and the first connector; and
   a receiver and in optical communication with the second connector;
   wherein:
      said first light source is configured to create a first light pattern;
      said second light source is configured to create a second light pattern;
      said first light pattern and said second light pattern are distinct;
      said first light source is configured to light a single first fiber housed by the cable at the first connector;
      said optical splitter is configured to split light from said second light source such that each of the remaining plurality of fibers housed by the cable, other than the single first fiber lit by said first light source, are lit by said second light source via said optical splitter at the first connector; and
      said receiver is configured to receive and display said first and second light patterns at the second connector after said first and second light patterns have travelled through the plurality of fibers.

13. The test device as claimed in claim 12, further comprising a controller, wherein said controller is in electronic communication with said first light source and said second light source.

14. The test device as claimed in claim 13, wherein said controller is also in electronic communication with said receiver.

15. The test device as claimed in claim 12, wherein said first light source and said second light source are red lasers.

16. The test device as claimed in claim 12, wherein said first light source and said second light source have different wavelengths.

17. The test device as claimed in claim 12, wherein said first light source and said second light source emit non-visible light.

18. The test device as claimed in claim 12, wherein said receiver is a passive receiver.

19. The test device as claimed in claim 12, wherein said receiver is an intelligent receiver.

20. A test device configured to test a plurality of fibers housed by a cable extending between a first connector and a second connector, wherein the plurality of fibers are terminated at each of the first and second connectors, said test device consisting of:
   a first light source;
   a second light source;
   a third light source;
   a first optical splitter disposed between said second light source and the first connector;
   a second optical splitter disposed between said third light source and the first connector;
   a receiver in optical communication with the second connector;
   wherein:
      said first light source is configured to create a first light pattern;
      said second light source is configured to create a second light pattern;
      said third light source is configured to create said second light pattern;
      said first light pattern and said second light pattern are distinct;
      said first light source is configured to light a single first fiber housed by the cable at the first connector;
      said first optical splitter is disposed between said second light source and the first connector;
      said second optical splitter is disposed between said third light source and the first connector;
      said first optical splitter is configured to split light from said second light source and said second optical splitter is configured to split light from said third light source, such that each of the remaining plurality of fibers housed by the cable, other than the single first fiber lit by said first light source, are lit by said second and third light sources via said first and second optical splitters at the first connector; and said receiver is configured to receive and display said first and second light patterns at the second connector after said first and second light patterns have travelled through the plurality of fibers.

21. The test device as claimed in claim 20, wherein said first, second, and third light sources are red lasers.

22. The test device as claimed in claim 20, wherein said first, second, and third light sources have different wavelengths.

23. The test device as claimed in claim 20, wherein said first, second, and third light sources emit non-visible light.

24. The test device as claimed in claim 20, wherein said receiver is a passive receiver.

25. The test device as claimed in claim 20, wherein said receiver is an intelligent receiver.

26. The test device as claimed in claim 20, further comprising a controller, wherein said controller is in electronic communication with said first light source and said second light source.

27. The test device as claimed in claim 26, wherein said controller is also in electronic communication with said receiver.

* * * * *